(12) United States Patent
Galloway et al.

(10) Patent No.: US 6,735,040 B2
(45) Date of Patent: May 11, 2004

(54) SERVO FLAW DETECTION USING PES AND VELOCITY THRESHOLDS

(75) Inventors: Paul Alexander Galloway, Prior Lake, MN (US); Jianxu Ma, Singapore (SG); ToaYou Tan, Singapore (SG); LeokHwa Chua, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 280 days.

(21) Appl. No.: 10/035,665

(22) Filed: Dec. 28, 2001

(65) Prior Publication Data

US 2003/0048570 A1 Mar. 13, 2003

Related U.S. Application Data

(60) Provisional application No. 60/317,177, filed on Sep. 5, 2001.

(51) Int. Cl.[7] .............................................. G11B 5/596
(52) U.S. Cl. ................................. 360/78.06; 360/77.05
(58) Field of Search ......................... 360/78.06, 77.02, 360/77.04, 77.08, 25, 31, 77.05, 77.07, 75

(56) References Cited

U.S. PATENT DOCUMENTS

| | | | | |
|---|---|---|---|---|
| 5,262,907 A | | 11/1993 | Duffy et al. | 360/77.05 |
| 5,710,677 A | * | 1/1998 | Teng et al. | 360/77.08 |
| 5,870,243 A | | 2/1999 | Ukani et al. | 360/77.08 |
| 5,889,631 A | | 3/1999 | Hobson | 360/75 |
| 5,930,068 A | | 7/1999 | Gregg et al. | 360/77.05 |
| 6,005,739 A | * | 12/1999 | Yun | 360/77.04 |
| 6,078,452 A | * | 6/2000 | Kittilson et al. | 360/51 |
| 6,181,500 B1 | * | 1/2001 | Serrano et al. | 360/53 |
| 6,353,315 B1 | * | 3/2002 | Egan et al. | 324/212 |
| 6,392,831 B1 | * | 5/2002 | Yeo et al. | 360/53 |
| 6,611,397 B1 | * | 8/2003 | Nguyen | 360/77.08 |
| 6,654,193 B1 | * | 11/2003 | Thelin | 360/53 |

\* cited by examiner

*Primary Examiner*—David Hudspeth
*Assistant Examiner*—Fred F. Tzeng
(74) *Attorney, Agent, or Firm*—Merchant & Gould P.C.

(57) ABSTRACT

An apparatus and method of identifying defective servo sectors in a data storage device detects servo sectors having an associated position error signal (PES) value that exceeds a predetermined PES threshold value, as well as servo sectors that have a related transducer velocity signal that exceeds a predetermined velocity threshold value.

25 Claims, 10 Drawing Sheets

SERVO FLAW DETECTION USING PES AND VELOCITY THRESHOLDS

RELATED APPLICATIONS

This application claims priority of U.S. provisional application Serial No. 60/317,177, filed Sep. 5, 2001.

FIELD OF THE INVENTION

This application relates generally to the field of data storage devices and more particularly, but not by way of limitation, to the detection of servo sector flaws using both position error signal (PES) thresholds and transducer velocity thresholds.

BACKGROUND OF THE INVENTION

Modern hard disc drives include one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of a magnetic circuit comprising one or more permanent magnets and magnetically permeable pole pieces. When controlled DC current is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

Control of the position of the heads is typically achieved with a closed loop servo system such as disclosed in U.S. Pat. No. 5,262,907 entitled HARD DISC DRIVE WITH IMPROVED SERVO SYSTEM, issued to Duffy et al., assigned to the assignee of the present invention. A typical servo system utilizes servo information that is written to the discs during the disc drive manufacturing process to detect and control the position of the heads through the generation of a position error signal (PES) that is indicative of the position of the head with respect to a selected track. More particularly, during track following in which the head is caused to follow a selected track, the servo system generates the PES from the received servo information and then uses the PES to generate a correction signal which is provided to a power amplifier to control the amount of current through the actuator coil, in order to adjust the position of the head accordingly.

Typically, the PES is presented as a position dependent signal having a magnitude indicative of the relative distance between the head and the center of a track and a polarity indicative of the direction of the head with respect to the track center. Thus, it is common for the PES to have normalized values corresponding to a range of, for example −1.0 to +1.0, as the head is swept across a selected track and to have a value corresponding to a value of 0 when the head is positioned over the center of the track. As will be recognized, modern servo systems typically generate the PES as a sequence of digital samples which generally correspond to the above analog range.

The PES value is generated by the servo system by comparing the relative signal strengths of burst signals generated from precisely located magnetized servo fields in the servo information on the disc surface. The servo fields are generally arranged in an "offset checkerboard" pattern so that, through manipulation of the magnitudes of the burst signals provided to the servo system as the servo fields are read, the relative position of the head to a particular track center can be determined and controlled. More particularly, digital representations of the analog burst signals are typically provided to a servo loop microprocessor (or digital signal processor), which obtains a digital representation of the value of the PES from a selected combination of the input digital representations of the analog burst signals. The microprocessor then compares the value of the PES to a desired value indicative of the desired position of the head to the selected track and issues a digital correction signal to the power amplifier, which in turn provides an analog current to the actuator coil to adjust the position of the actuator accordingly.

The servo information, including the servo fields, are written to the discs during the manufacturing process using a highly precise servo track writer. Although methodologies vary in the writing of the servo information, typically the disc drive is mounted on the servo track writer and the appropriate write signals are provided to the heads of the disc drive to write the servo information while the discs are rotated by the disc drive spindle motor. A mechanical pusher arm is used to incrementally advance the heads over the surfaces of the discs while a closed loop positional control system ensures the heads are properly located relative to the discs. Depending upon a particular configuration, each servo field is typically written using a plurality of rotations of the disc, with a portion of the servo field being written during each rotation of the disc.

Once all of the discs for a given disc drive have been servo-written, the disc drive is typically subjected to a number of performance and media test. One such test involves examining the discs of the disc drive for defective servo sectors. During this test data is written to and then read from each of the data sectors on each of the tracks on a disc or discs. During the read/write testing process the absolute value of each PES value is compared to a predetermined safe-threshold. Should the value of the PES for, or associated with, a particular sample exceed the threshold, a servo unsafe signal is generated to indicate that there was an error in tracking or that the PES value that was generated as a result of reading a particular servo sector is faulty. Once defective servo sectors have been located, the defective servo sectors are typically marked or designated in a defect map so that these sectors, or tracks containing these sectors, can be avoided or ignored during normal disc drive operation.

A selected PES value may exceed the safe-threshold value during a read or write operation for a variety of reasons. One such reason is the existence of a localized defect in the servo information associated with the selected PES value; in such a case, the head is correctly located with respect to the track, but the reported PES value erroneously indicates otherwise. Such a defect in the servo information can occur as a result of a localized anomaly in the media on the surface of a disc, so that the media does not possess the necessary magnetic properties to allow the servo information to be written at this location.

Conventional disc drive testing methods, as described above, are typically effective in locating defective servo sectors that are the result of a PES value exceeding a set PES threshold. Unfortunately, there are other servo sector flaws that do not manifest themselves by causing a PES value to exceed a set PES threshold. For example, a servo sector error known as a track tear may occur which never causes the PES value to exceed a set PES threshold. A track tear error is characterized as a radial discontinuity, so that a track having a track tear ends at a different radius than it begins. That is, the radius of the track varies with respect to angular position over at least a portion of the track. If the defective servo sectors which cause the track tear errors are not identified during the performance and media tests, the disc drive may pass the manufacturing tests only to fail later in reliability testing or during operation after the drive has been shipped from the manufacturer to the ultimate disc drive user.

As such, there is a need for an improved approach to detecting the defective servo sectors, which includes locating defective servo sectors that are manifested by a PES value exceeding a set PES threshold as well as defective servo sectors that do not cause a PES value exceeding a set PES threshold, but which still cause track tears.

SUMMARY OF THE INVENTION

Against this backdrop the present invention has been developed. Various embodiments of the present invention relate to methods for identifying defective servo sector in a data storage device. More particularly, various methods described herein relate to identifying as defective those servo sectors in the data storage device having an associated position error signal (PES) value that exceeds a predetermined PES threshold value, as well as those servo sectors in the data storage device having a related transducer velocity signal that exceeds a predetermined velocity threshold value.

One method described herein relates to detecting defective servo sectors in a data storage device. In this method, data is stored in data sectors on tracks located in the data storage device. In addition to the data sectors, the tracks also include a number of servo sectors that include, among other things, information that is used in determining a position error signal (PES) value for each servo sector. The data storage device also includes a transducer for accessing the information in the servo sectors. With respect to this particular method, a first servo sector on one of the tracks is accessed using the transducer. A determination is then made as to whether a position error signal (PES) value associated with the first servo sector exceeds a predetermined PES threshold value. If the PES threshold value associated with the first servo sector exceeds the predetermined PES threshold value, the first servo sector is identified as defective. If, however, the PES value associated with the first servo sector does not exceed the predetermined PES threshold value, a determination is made as to whether a transducer velocity signal associated with the first servo sector exceeds a predetermined velocity threshold value. If the transducer velocity signal associated with the first servo sector exceeds the predetermined velocity threshold value, the first servo sector is identified as defective. That is, even if the PES value associated with the first servo sector servo does not exceed the predetermined PES threshold value, the first servo sector will still be recognized as defective if the transducer velocity signal associated with the first servo sector exceeds the predetermined velocity threshold value sector. In this way, defective servo sectors that may have gone unnoticed using prior defective servo sector detection methods that will be identified.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION

Figure 1:
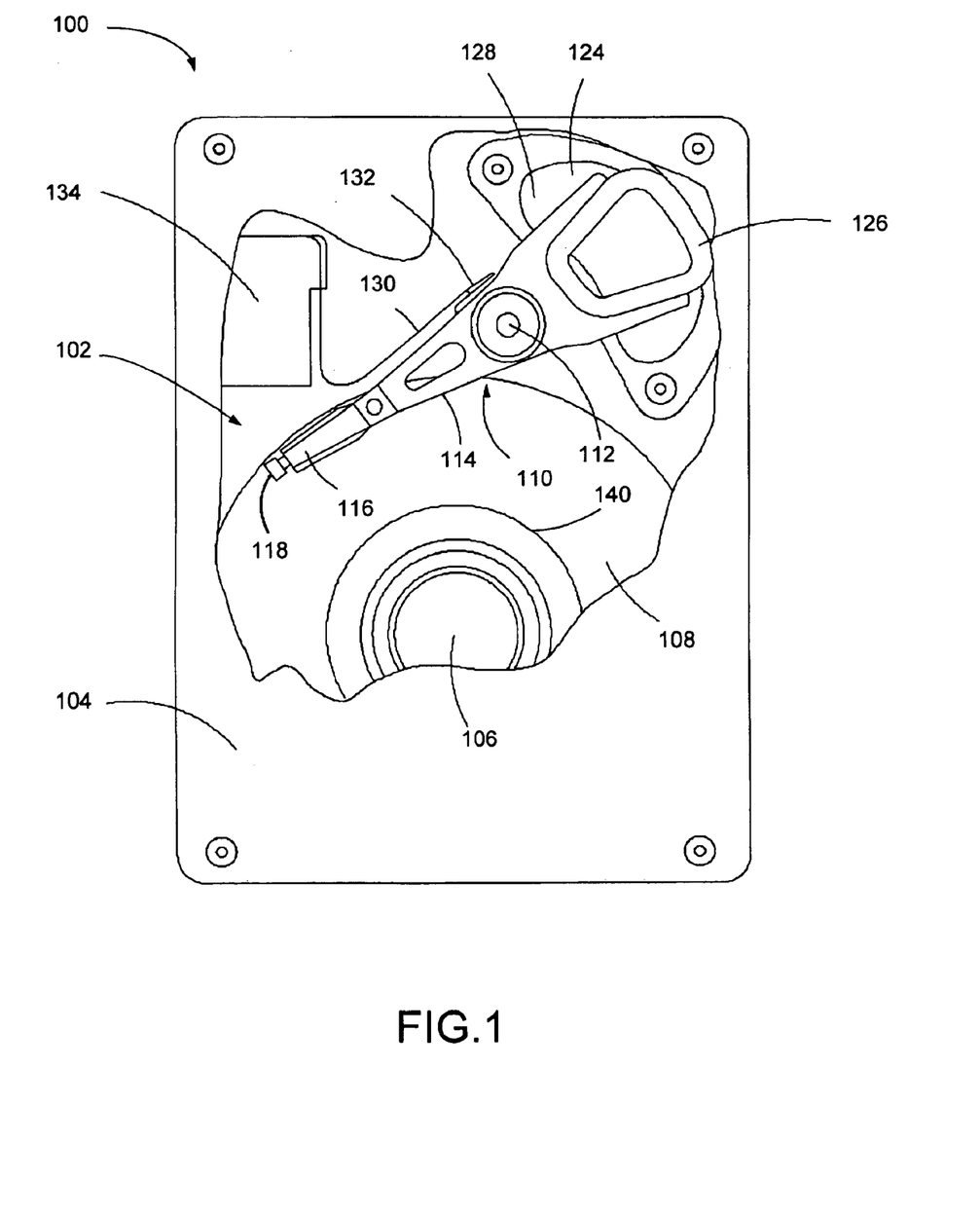
FIG. 1 is a plan view of a disc drive incorporating an embodiment of the present invention.

A disc drive 100 incorporating an embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks, such as exemplary track 140, on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes a write transducer (not shown) for writing to the disc 108 and a read transducer (not shown) for reading from the discs 108. Also mounted to the distal end of each of the flexures is an air bearing slider that enables the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

It will be recognized that in a typical disc drive there will be one head per disc surface, multiple discs, and multiply tracks on each disc. However, for purposes of clarity only one head 108 and one disc have been shown in FIG. 1. It will further be recognized that servo information will be prerecorded on at least one of the surfaces of the discs 108 to provide the requisite servo positioning information to a servo system 520, which is shown generally in FIG. 5.

In a dedicated servo system one surface of one disc is designated as a dedicated servo surface so that servo information is prerecorded on all of the tracks and user data is stored on the remaining disc surfaces. In such a case one head would be a servo head and another head would be a data head. Alternatively, in an embedded servo system, the servo information is intermittently prerecorded on all of the tracks 140, so that each of the tracks 140 on the disc 108 would contain both servo information and user data and the heads 118 would operate as both a servo and a data head. In a preferred embodiment an embedded servo system is used and for purposes of illustration track 140 is contemplated as including such embedded servo information which is read by the head 118 and provided to the servo loop shown in FIG. 4.

Figure 2:
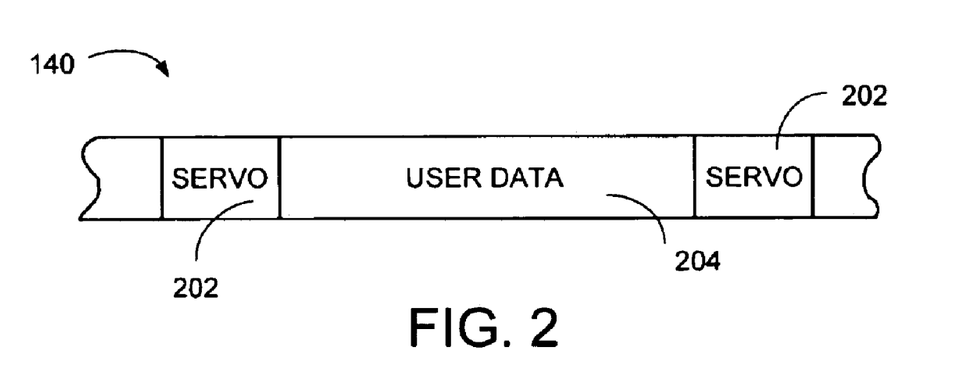
FIG. 2 provides a representation of a portion of a selected track of the disc drive of FIG. 1, illustrating the relative placement of servo fields and data fields on the selected track.

Referring now to FIG. 2, shown therein is a generalized representation of a portion of a selected data track 140 of the disc drive 100 employing an embedded servo system. FIG. 2 illustrates the relative placement of servo sectors 202 and data sectors 204. As will be recognized, the servo information on the discs 108 is recorded in the servo sectors 202 during the manufacturing of the disc drive 100 using a highly precise servo writer, as described in greater detail below. Data is then written to or read from one or more data fields 204. As is typical, the distance along the track 140 between adjacent servo sectors 202 will vary depending upon the radius of the track 140. A selected number of the servo sectors 202 are commonly written to all of the tracks 140 on each disc 108, with the start of each corresponding servo sector 202 on each surface of the discs being generally radially aligned. However, in a zone bit arrangement the surface of the disk is divided into a set of zones. Each zone extends for a fixed radial length, and the magnetic transition frequency is increased from zone-to-zone, in the radially outward direction. Accordingly, the number of servo sectors 202 in each track increases, from zone-to-zone, in the radially outward direction.

Figure 3:
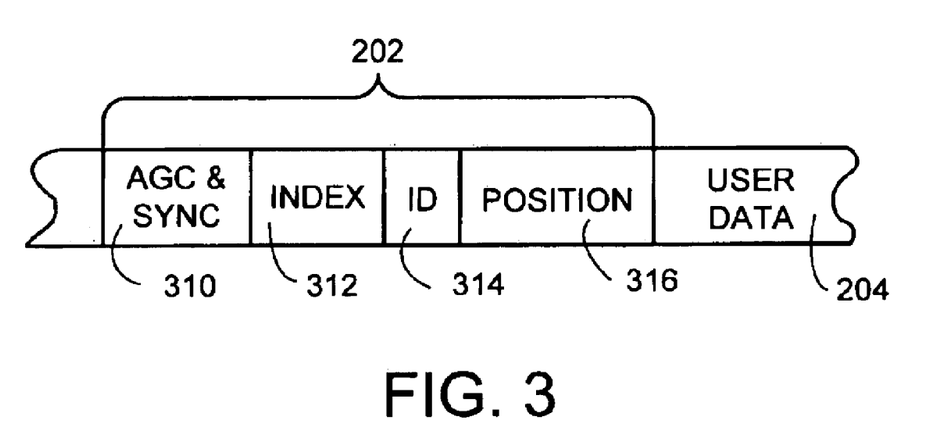
FIG. 3 illustrates the general format of a servo field of the disc drive servo system of FIG. 2.

The general format of a servo sector 202, as shown in FIG. 3, comprises an AGC & Sync field 310, an index field 312, a track ID field 314 and a position field 316. The AGC & Sync field 310 facilitates the generation of timing signals used by the disc drive 100, the index field 312 indicates radial position of the track, the track ID field 314 provides the track address (number), and the position field 316 provides an indication of the position of the associated head 118 with respect to the servo frame 202. Of course, alternative or additional fields may be used as desired and the format of the fields in a servo frame will depend upon the construction of a particular disc drive; for a more detailed discussion of typical servo fields, see U.S. Pat. No. 5,262,907 to Duffy et al. and U.S. Pat. No. 5,136,439 to Weispfenning et al.

Figure 4:
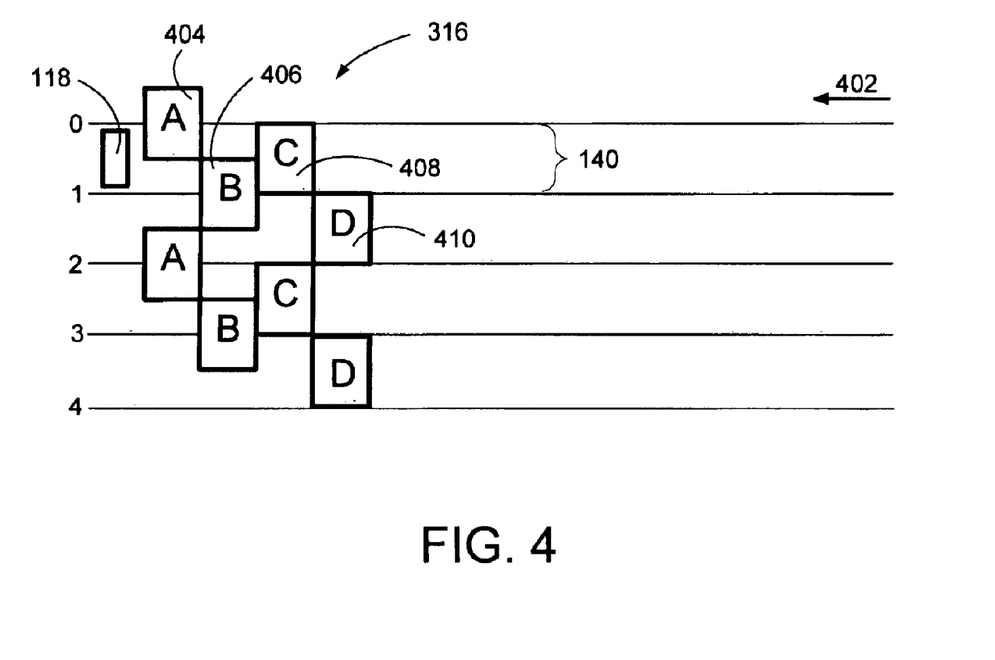
FIG. 4 illustrates a format of position field of the servo field of FIG. 3.

The position field 316 comprises a number of burst fields, which together form a burst pattern. It should be understood that the present invention is not limited to a particular burst pattern. However, for purposes of illustration, a four position burst field arranged in an offset, quadrature pattern, is shown in FIG. 4. More particularly, FIG. 4 shows the position field 316 to comprise burst patterns A, B, C, and D having selected geometries and magnetization vectors, defining a plurality of track boundaries identified as 0–4. Thus, each track comprises the area bounded by two adjacent track boundaries (e.g., the track 140 of FIG. 1 is represented in FIG. 4 to be bounded by the track boundaries 0 and 1. Additionally, the head 118 of FIG. 1 is represented in FIG. 4 as being centered on the track 140. The direction of rotation of the disc 108 (and hence the position field 316) relative to the head 118 is shown by arrow 402.

Both the A and B burst patterns are shown to extend from the center of one track to the center of an immediately adjacent track, with these patterns offset in a "checkerboard" fashion. Additionally, the C and D burst patterns extend from one track boundary to the next track boundary, with these patterns also offset as shown. Thus, as the head 118 passes over the position field 316 on track 140, the head will pass over portions of the A and B burst patterns (identified as 404 and 406, respectively) and then over C burst pattern 408. However, the head 118 will not encounter D burst pattern 410, as this pattern is on an adjacent track. For reference, tracks having C burst patterns are referred to as "even tracks" and tracks with D burst patterns are referred to as "odd tracks."

Generally, it will be recognized that when the head 118 is centered at the mid-point of track 140, the amplitude of an A burst signal induced in the head 118 by the A burst pattern 404 will be equal to the amplitude of a B burst signal induced in the head by the B burst pattern 406. Moreover, the amplitude of a C burst signal induced by the C burst pattern 408 will have a maximum value and the amplitude of a D burst signal from the D burst pattern 410 will be nominally zero. Further, when the head 118 is positioned over the track boundary 1, the amplitudes of the C and D burst signals from the patterns 408 and 410 will be equal in magnitude, the B burst signal from the pattern 86 will have a maximum value and the A burst from the pattern 84 will be zero. Thus, as the head 118 is swept from one track boundary to the next, the amplitudes of the A, B, C and D burst signals cycle between zero and maximum values.

Figure 5:
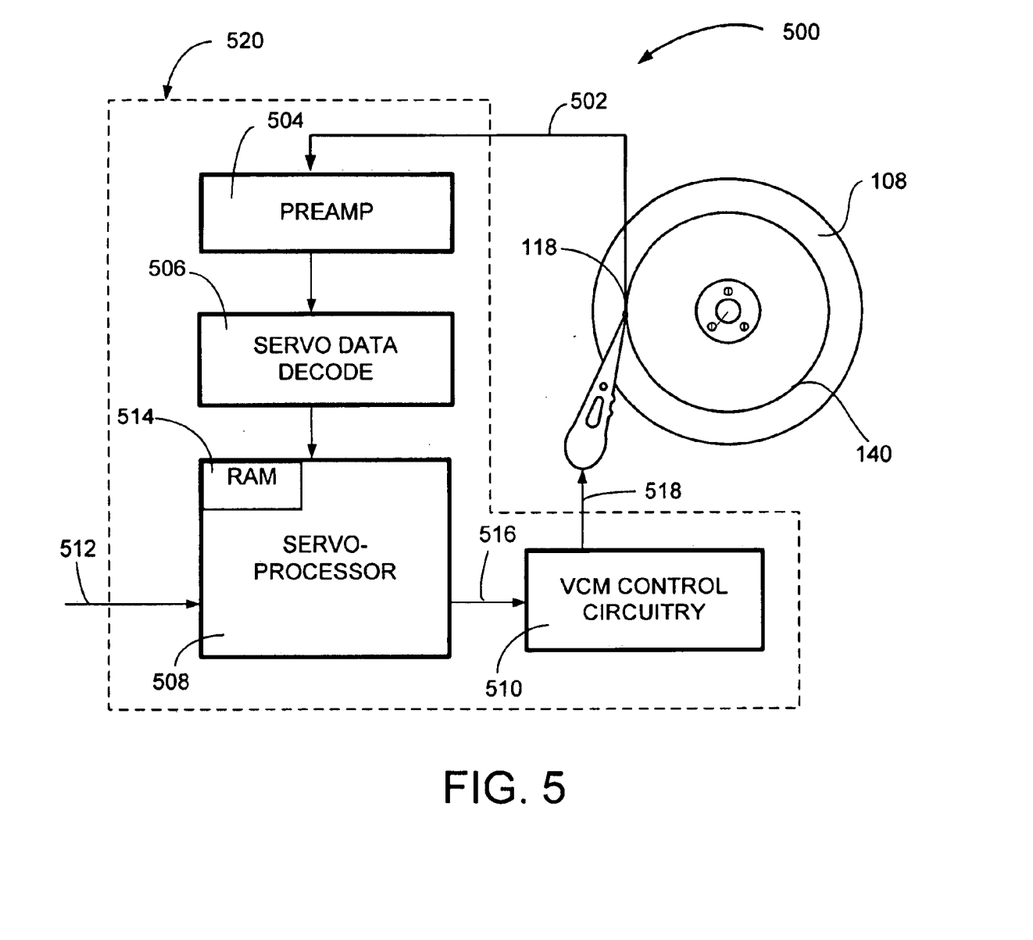
FIG. 5 illustrates a functional block representation of a servo system for the disc drive of FIG. 1.

Referring now to FIG. 5, the disc drive 100 preferably includes a servo loop 500 employing a servo system 520. In operation of the disc drive 100 (FIG. 1), as the head 118 travels over the track 140 and reads the servo information from the servo field 202 (FIG. 2). This servo information is then amplified by a preamp circuit 504 and provided to a servo data decode logic circuitry 506. The servo data decode logic circuitry 506 typically includes an analog to digital converter (ADC) so that selected digital representations of the servo information are provided to a servo microprocessor 508. The servo microprocessor 508 generates a position error signal (PES) from the servo information and uses the PES to generate and output a correction signal to a VCM control circuitry 510. The servo microprocessor 508 determines the correction signal in accordance with commands received by a disc drive system microprocessor (not shown) by way of signal path 512 and programming steps stored in a servo RAM 514. The correction signal is provided to the VCM control circuitry 510, which includes a power amplifier (not shown) that outputs a controlled dc current of a selected magnitude and polarity to the coil 126 in response to the correction signal. Thus, during track following mode, the servo information indicates the relative position error of the head 118 with respect to the center of the track 140 and the correction signal causes a correction in the dc current applied to the coil 126 in order to compensate for this position error and move the head 118 to the center of the track 140 (or another position relative to the track 140, as desired). For additional discussion concerning the general construction and operation of the servo loop 500, see U.S. Pat. No. 5,262,907 to Duffy et al., as well as U.S. Pat. No. 5,136,439 entitled SERVO POSITION DEMODULATION SYSTEM, issued Aug. 4, 1992 to Weispfenning et al., assigned to the assignee of the present invention. Moreover, it will be understood that new, additional programming may be stored in the RAM 514 and used by the servo microprocessor 508 in controlling the operation of the servo loop 500 as discussed in greater detail below.

As discussed above, one or more servo sectors 202 on a track may be defective. For example, a selected PES value may have a value that exceeds a PES safe-threshold value during a read or write operation for a variety of reasons. One such reason is the existence of a localized defect in the servo information associated with the PES value. In such a case, the head is correctly located with respect to the track, but the reported PES value erroneously indicates otherwise. Such a defect in the servo information can occur as a result of a localized anomaly in the media on the surface of a disc, so that the media does not possess the necessary magnetic properties to allow the servo information to be written at this location.

Figure 6:
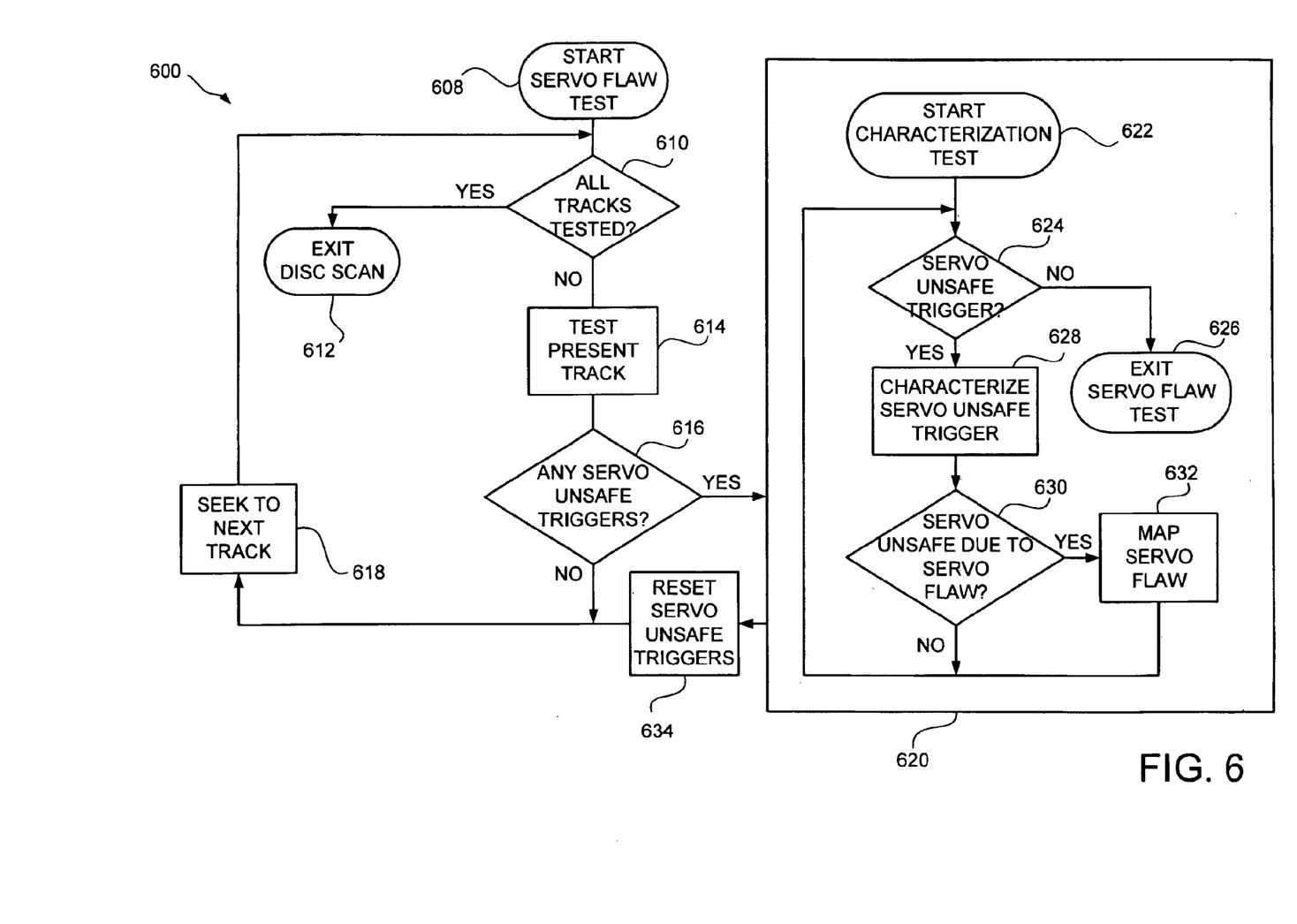
FIG. 6 illustrates an operation flow of a disc drive servo flaw test for detecting defective servo sectors.

As also discussed above, prior disc drive servo flaw testing methods are typically effective in locating defective servo sectors that are the result of a PES value exceeding a set PES threshold. FIG. 6 illustrates one simplified example of a disc drive servo flaw test for detecting defective servo sectors. As will be described, the servo flaw test 600 detects servo flaws by detecting servo sectors that generate, or have associated therewith, PES values exceeding a preset PES threshold.

As shown in FIG. 6, following the start 608 of the servo flaw test 600 a determination operation 610 determines if all of the tracks on a surface of a disc, or all of the tracks on the entire disc drive, have been tested. If all of the tracks have been tested, the servo flaw test 600 is exited 612. If all of the tracks have not been tested, the operation flow of the servo flaw test 600 continues to a track test operation 614. The track test operation 614 then tests each servo sector on the present track. The track test operation may be conducted along with, or as a part of a general disc read write test, where data is written to and read from a track. During the track test operation, a servo unsafe trigger is set each time the PES value exceeds a preset threshold. The servo unsafe trigger may be indicated in any number of ways. For example, the servo unsafe trigger may be a simple bit or flag that can be asserted or deasserted.

Following the track test operation 614, a servo unsafe determination operation 616 determines if any servo unsafe triggers have been set. If the determination operation 616 determines that no servo unsafe triggers have been set, seek operation 618 then seeks to the next track to be tested. Following the seek operation 618, the operational flow of the servo flaw test 600 returns to the determination operation 610 where a determination is made as to whether all of the tracks on a surface of a disc, or all of the tracks on the entire disc drive, have been tested.

Returning to determination operation 616, if it is determined therein that a servo unsafe trigger has been set, the operational flow of the servo flaw test 600 proceeds to a characterization test 620. Servo flaw tests, such as characterization test 620, are typically used in disc drives to characterize and, in some systems, to "map out" defective servo sectors. In some disc drive characterization testing methods a track will be determined to be defective if a servo sector error is detected. In such a case, the track having the defective servo sector will "mapped out." That is, data that is to be written to the track having the defective servo sector will be recorded to, and read from, an alternative "spare" track located on the disc. In other characterization testing methods the location of a defective servo sector will be "mapped" and the defective servo sector will then be skipped, or ignored, by the servo control loop when track following and/or track seeking. Typically, the servo information from the preceding servo sector will be used in place of the information from the defective servo sector. The "mapping" of the defective servo sector may occur in a number of ways, including storing a "map" of the location of the defective servo sectors in some form of non-volatile memory, such as, and without limitation, a reserved track on the disc drive, in flash-RAM, or in ROM. The location of a defective servo sector on a given track may be indicated on a non-defective portion of the given track, such as in a servo sector or data sector preceding the defective servo sector.

Turning now to the details of the characterization test 620. Following the start 622 of the characterization test 620, a determination operation 624 determines if any servo unsafe triggers have been set. If no servo unsafe triggers have been set, the characterization test is exited 626. If any servo unsafe trigger has been set, characterization operation 628 characterizes the servo unsafe signal. If more than one servo unsafe trigger has been set, the characterization test may "step through" each servo unsafe trigger one at a time. That is, each time the characterization operation 628 is performed, another servo unsafe trigger can be characterized.

Following the characterization of the servo unsafe signal by the characterization operation 628, servo unsafe determination operation 630 determines if the servo unsafe trigger that was characterized by the preceding characterization operation 628 was due to a flawed servo sector. If the servo unsafe determination operation 630 determines that the servo unsafe trigger was not the result of a servo flaw, the operational flow of the characterization test 620 returns to the servo unsafe determination operation 624. If, on the other hand, the servo unsafe determination operation 630 determines that the servo unsafe trigger was the result of a servo flaw, a mapping operation 632 maps the location of the flawed servo sector and the operational flow of the characterization test 620 returns to the servo unsafe determination operation 624.

Upon exit of the characterization test 620, a reset operation 634 in the servo flaw test 600 resets any servo unsafe triggers that were set during the track test operation 614 and the seek operation 618 then seeks to the next track to be tested. Following the seek operation 618, the operational flow of the servo flaw test 600 returns to the determination operation 610 where a determination is made as to whether all of the tracks on a surface of a disc, or all of the tracks on the entire disc drive, have been tested.

The disc scan operation may be very effective in detecting a servo sector flaw that is the result of a PES signal exceeding a preset threshold. Unfortunately, as noted above, there are other servo sector flaws that do not manifest themselves by causing a PES value to exceed a set PES threshold. For example, a servo sector error known as a track tear may occur which never causes the PES value to exceed a set PES threshold. A track tear error is characterized as a radial discontinuity, so that a track having a track tear ends at a different radius than it begins. That is, the radius of the track varies with respect to angular position over at least a portion of the track. If the defective servo sectors which cause the track tear errors are not identified during the performance and media tests, the disc drive may pass the manufacturing tests only to fail later in reliability testing or during operation after the drive has been shipped from the manufacturer to the ultimate disc drive user.

Figure 7:
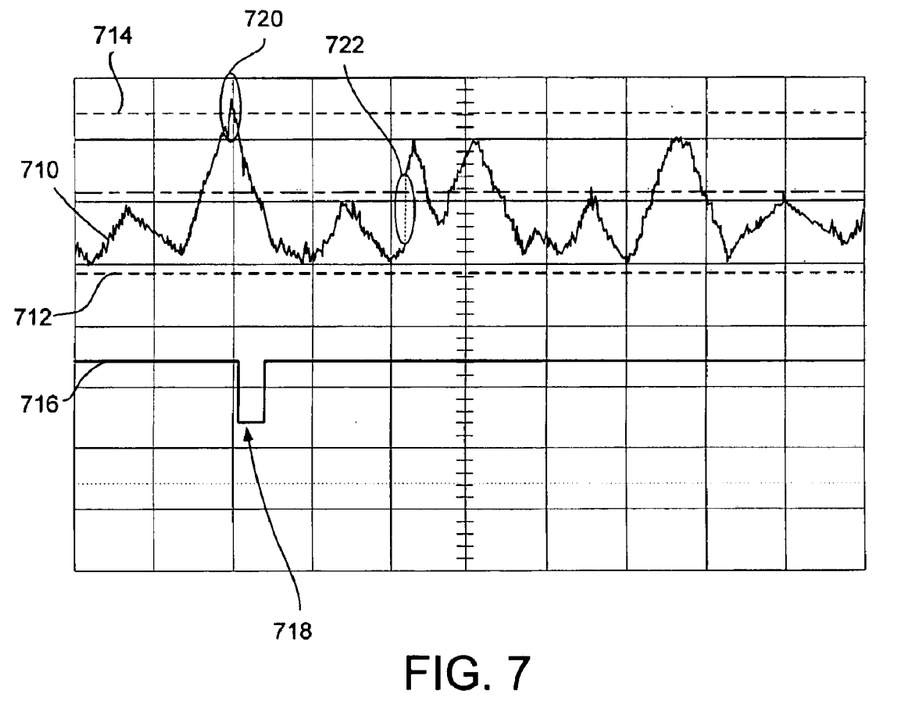
FIG. 7 illustrates an exemplary position error signal (PES) signal and a servo unsafe signal generated using the servo flaw test characterized by the operational flow illustrated in FIG. 6.

FIG. 7 illustrates a PES signal 710 over a given time in a disc drive that utilizes a servo flaw test, such as servo flaw test 600, that triggers a servo unsafe condition only when a PES value exceeds a PES threshold. Also illustrated in FIG. 7 are PES threshold limits 712 and 714, as well as a servo unsafe signal 716 that has been triggered 718 by the PES signal exceeding 720 a threshold limit 714. As also shown in FIG. 7, the PES signal also indicates that a track tear 722 or other servo flaw that causes a rapid acceleration or position change of the head 118 across the track has occurred. This servo flaw 722 is revealed by the rapid change in the PES signal 722. Servo flaw tests that trigger a servo unsafe condition only when a PES value exceeds a PES threshold will not detect such flaws. Unfortunately, a certain number of disc drives may pass these types of servo flaw during manufacturing testing, such as servo flaw test 600, yet fail due to a track tear 722, or other servo flaw that causes a rapid acceleration or position change of the head 118 across the track, yet fail when they are in use by a consumer.

Figure 8:
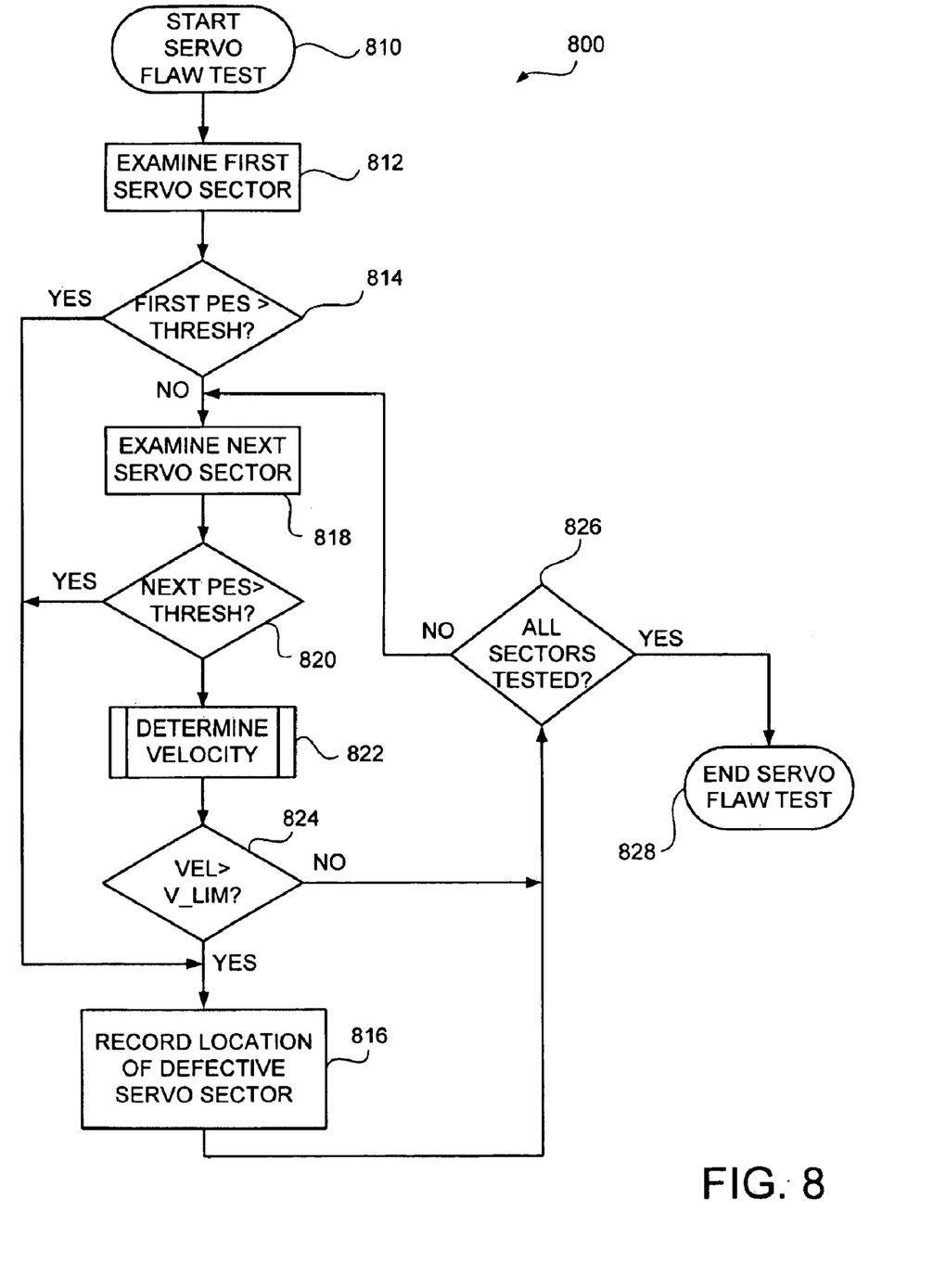
FIG. 8 illustrates an operation flow of a disc drive servo flaw test for detecting defective servo sectors in accordance with one embodiment of the present invention.
Figure 9:
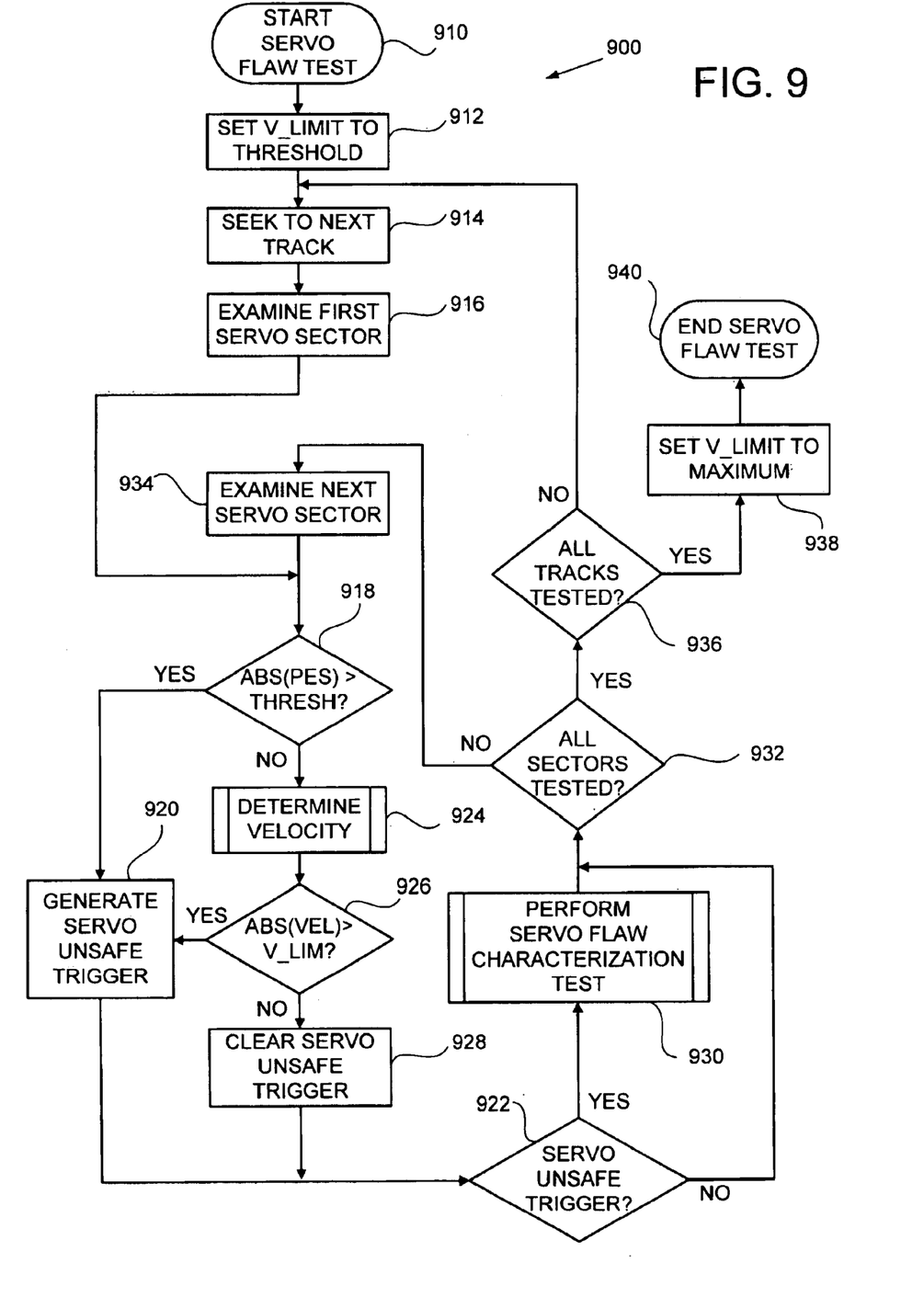
FIG. 9 illustrates an operation flow of a disc drive servo flaw test for detecting defective servo sectors in accordance with another embodiment of the present invention.

Embodiments of the present invention provide an apparatus and/or method for detecting both servo flaws that can be identified when a PES value exceeds a PES threshold, as well as servo flaws due to a track tear, or other servo flaw that causes a rapid acceleration or position change of a head across the track. FIGS. 8 and 9 provide flowcharts illustrating the general operations performed in the practice of the embodiments of the present invention and are generally indicative of programming used by a processor, such as servo-processor 508 (FIG. 5), in the control of the servo system 520, or other microprocessor or signal processor.

The logical operations of the embodiments of the invention herein described may be implemented (1) as a sequence of processor implemented acts or program modules running on a processor and/or (2) as interconnected machine logic circuits or circuit modules within a computing device. The implementation is a matter of choice dependent on performance requirements. Accordingly, the logical operations described may be referred to variously as operations, routines, structural devices, acts, or modules. While the logic operations of following embodiments of the invention are discussed as being implemented as software stored on a computer readable media, it will be recognized by one skilled in the art that these operations, structural devices, acts and modules may be implemented in software, in firmware, in special purpose digital logic, and any combination thereof without deviating from the spirit and scope of the present invention as recited within the claims attached hereto.

A computing device, such as the servo-processor 508, typically includes at least some form of computer-readable media, such as RAM 514. However, computer readable media can be any available media that can be accessed by the servo-processor 508. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disc storage or other magnetic storage devices, or any other medium that can be used to store the desired information and that can be accessed by the microprocessor 508.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Various operational flows 800 and 900 of embodiments of the present invention will now be described. These processes may initially take place during a certification process which occurs after a data storage device on which the processes are employed have been assembled and after servo information has been written to the storage media. Furthermore, parts of these processes may continue to be employed during the normal operation of the data storage device. For example, as explained in greater detail below with respect to FIG. 9, a part of servo flaw test 900 that detects defective servo sectors that are characterized by a head velocity exceeding a predetermined threshold, may be used during certification only and "deactivated" during normal disc drive operation. In such a case, that part of the servo flaw test 900 that detects defective servo sectors that are characterized by a PES signal exceeding a predetermined threshold may continue during normal drive operation. Additionally, these processes may be run on their own, or in conjunction with, or a part of, other processes.

It is to be understood that the processes herein described are not dependent on the method in which the servo information has been written to the storage media. For example, if the processes are carried out on a disc drive, the servo information may have been written to the disc or discs of the disc drive in a conventional manner with a servo writer, using self-propagating servo writing techniques, or by any number of other servo writing techniques. The operational flows 800 and 900 may take place entirely within the data storage device under the control of a servo-processor, such as servo processor 508. Alternatively, the operational flows 800 and 900 described below may also take place under the control of a processor outside the data storage device, such as a personal computer or work station operatively attached to the disc drive 100.

FIG. 8 is one example of a servo flaw test in accordance with the present invention. This servo flaw test 800 may be performed on a data storage device that uses servo sector information recorded on a storage medium for positioning read and/or write transducers relative to the recording medium. As shown in FIG. 8, following the start 810 of the servo flaw test 800, a first servo sector examination operation 812 examines a first servo sector by reading servo information contained or coded in the first servo sector to determine a PES signal associated with the servo sector being examined. Next, a first PES determination operation 814 determines if the PES signal associated with the first servo sector is greater than a predetermined PES threshold value. The first PES determination operation 814 may determine if the PES signal is greater than a predetermined PES threshold value by examining the PES signal, as that signal is provided by the servo control system of the data storage device. The first PES determination operation 814 may determine whether the PES signal has exceed a positive PES threshold and/or a negative PES threshold. If the first PES determination operation 814 determines that the PES signal is greater than a predetermined PES threshold value, a servo unsafe trigger is generated and the operational flow of the servo flaw test continues to a record location operation 816, which will be discussed in greater detail below.

If the first PES determination operation 814 determines that the PES signal is less than or equal to the predetermined PES threshold value, the next servo sector to be checked is examined by a next servo sector examination operation 818. Preferably, but not necessarily, the next servo sector to be examined will be the servo sector that is next encountered by the transducer. Following the next servo sector examination operation 818, a next PES determination operation 820 determines if the PES signal associated with the next servo sector is greater than a predetermined PES threshold value. As with the first PES determination operation 814, the next PES determination operation 818 may determine if the PES signal associated with the next servo sector is greater than a predetermined PES threshold value by examining the PES signal, as that signal is provided by the servo control system of the data storage device. The next PES determination operation 818 may determine whether the PES signal has exceed a positive PES threshold and/or a negative PES threshold. If the next PES determination operation 818 determines that the PES signal is greater than a predetermined PES threshold value, a servo unsafe trigger is generated and the operational flow of the servo flaw test continues to a record location operation 816, which will be discussed in greater detail below.

If the next PES determination operation 820 determines that the PES associated with the next servo sector signal is less than or equal to the predetermined PES threshold value, a velocity determination operation 822 then determines the velocity of the transducer. The determination of the velocity of the transducer may be made in a number of ways. One manner in which the velocity may be ascertained is by determining the derivative of the position of the transducer over some fixed time. In one embodiment, the position of the transducer is represented by the PES signal. As such, the velocity of the transducer may be ascertained by determining the derivative of the PES signal. In a digital processor, the derivative of the position may be characterized by the equation (1):

$$\text{Velocity}(v) = \frac{\text{Position}(n) - \text{Position}(n-1)}{\text{Sample Period } T} \quad (1)$$

This equation may be modified by fixing the Sample Period T. For example, the sample period may be the time between two servo sectors, where media is moving with a constant velocity. Thus, the Sample Period T may be removed from equation (1). Additionally, a scaling constant K may be added, where K is the sample rate period of the servo system, resulting in equation (2):

$$\text{Velocity}(v) = (\text{Present Position} - \text{Last Position}) \times K \quad (2)$$

Following the velocity determination operation, a velocity limit operation 824 determines if the velocity of the transducer, relative to the storage medium, exceeds a predetermined threshold. The velocity limit operation 824 may determine whether the velocity has exceeded a positive velocity limit and/or a negative velocity limit. The value of the velocity limit may be determined and set prior to the operational testing of the data storage unit. The exact value of the velocity limit is dependent on the parameters of the particular data storage unit being tested, and may be determined experimentally.

If the velocity limit operation 824 determines that the velocity is less than or equal to a predetermined velocity limit, the operational flow of the servo flaw test continues to an all sectors tested operation 826, described below. If the velocity limit operation 824 determines that the velocity is greater than a predetermined velocity limit, a servo unsafe trigger is generated and the operational flow of the servo flaw test continues to the record location operation 816.

The record location operation 816 functions to record the locations of defective servo sectors that cause a servo unsafe trigger. The record location operation 816 may record the locations of every servo sector that causes a servo unsafe trigger. Alternatively, the record location operation 816 may record the locations of only selected servo sectors that cause a servo unsafe trigger. Criteria for selecting servo sectors, the location of which may be recorded by the record location operation 816, may vary depending on various characteristics of the data storage device being tested.

Following the record location operation 816, an all sectors tested operation 826 determines if all of the sectors that were to be tested have, in fact, been tested. If the all sectors tested operation 826 determines that all of the sectors have not been tested, the operational flow of the servo flaw test 800 returns to the next PES determination operation 818. If, on the other hand, the all sectors tested operation 826 determines that all of the sectors have been tested, the servo flaw test is ended 828.

FIG. 9 illustrates another embodiment of a servo flaw test 900 in accordance with the present invention. The embodiment shown in FIG. 9 is particularly applicable to data storage devices, such as disc drive 100, which have a plurality of concentric tracks 140 and one or more read/write heads 118 for reading/writing data to the tracks. As described above, the servo flaw test 900 may take place during a certification process that occurs after servo sector information has been written to the discs of the disc drive 100. As also described above, the servo flaw test 900 will detect both servo flaws that that are manifested by PES signals that exceed thresholds, as well as servo sector flaws, such as track tears, that are manifested by a rapid acceleration or position change of the head 118 across the track.

As shown in FIG. 9, following the start 910 of the servo flaw test 900, a set limit operation 912 sets a velocity limit (V_LIMIT) to a predetermined threshold value. As described in greater detail below, V_LIMIT is used during the servo flaw test 900 to determine when a servo sector defect, such as a track tear condition, has occurred. The precise value of V_LIMIT will be dependent on the particular disc drive with respect to which the servo flaw test is being performed. The V_LIMIT may be determined and set prior to the testing of the data storage unit. The exact value of the velocity limit is dependent on the parameters of the particular data storage unit being tested, and may be modeled or determined experimentally with respect to the particular disc drive, or disc drive model, being tested.

Following the set limit operation 912, a seek operation seeks to the next track to be tested. As will be understood, the first time the seek operation 912 is called it will seek to the first track to be tested. Thereafter, the seek operation 914 will seek to the next track to be tested, and so on, until all of the tracks designated for testing have been tested. The tracks will preferably be tested according to a particular predetermined track order. For example, each of the tracks for each of the discs of the disc drive 100 from track 1 through track N may be tested in numerical order. However, it will be understood that the servo flaw test 900 is not limited to a track testing order.

Following the track seek operation 914, a first servo sector examination operation 916 examines the first servo sector on the disc drive 100 that is to be tested. For example, the examination operation 916 may examine the first servo sector on the track over which the read/write head 118 is positioned. The examination operation 916 may examine the servo sector by reading servo information contained or coded in the servo sector to determine a PES signal associated with the servo sector being examined. Next, a PES determination operation 918 determines if the absolute value of the PES signal associated with the previously examined servo sector is greater than a predetermined PES threshold value. If the PES determination operation 918 determines that the absolute value of the PES signal is greater than a predetermined PES threshold value, servo unsafe operation 920 generates a servo unsafe signal and the operational flow of the servo flaw test 900 continues to a servo unsafe determination operation 922, which will be discussed in greater detail below.

If the PES determination operation 918 determines that the absolute value of the PES signal is less than or equal to the predetermined PES threshold value, a velocity determination operation 924 then determines the velocity of the read/write head relative to the track over which the read/write head is positioned. The determination of the velocity of the transducer may be made in a number of ways. One manner in which the velocity may be ascertained is by determining the derivative of the position of the transducer over some fixed time. In one embodiment, the position of the transducer is represented over time by the PES signal. As such, the velocity of the transducer may be ascertained by determining the derivative of the PES signal. Further details regarding the manner in which the velocity determination operation 924 then determines the velocity of the read/write head relative to the track may be had with respect to the velocity determination operation 822 described above with respect to FIG. 8.

Following the velocity determination operation 924, a velocity limit operation 926 determines if the absolute value of the velocity of the read/write head, relative to the track being tested, exceeds a predetermined threshold. The value of the velocity limit may be determined and set prior to the operational testing of the disc drive. The exact value of the velocity limit is dependent on the parameters of the particular disc drive being tested, and may be determined experimentally.

If the velocity limit operation 926 determines that the absolute value of the velocity is less than or equal to a predetermined velocity limit, a clear servo unsafe operation 928 clears any servo unsafe triggers that may be set, for example by an earlier operation. The operational flow of the servo flaw test 900 then continues to the servo unsafe determination operation 922. If, on the other hand, the velocity limit operation 926 determines that the absolute value of the velocity is greater than a predetermined velocity limit, the servo unsafe operation 920 generates a servo unsafe signal and the operational flow of the servo flaw test 900 continues to the servo unsafe determination operation 922.

Next, the servo unsafe determination operation 922 determines if any servo unsafe triggers have been generated by the previously examined servo sector. If no servo unsafe triggers have been generated, the operational flow of the servo flaw test continues to an all sectors tested determination operation 932, as will be described in greater detail below. If, on the other hand, any servo unsafe triggers have been generated, a servo flaw characterization test or routine is called to characterize the servo flaw. The servo flaw characterization test 930 verifies that a servo burst that has caused the generation of a servo unsafe trigger is flawed in some way.

There are a number of servo flaw characterization tests known in the art that may be used for the servo flaw characterization test 930. Additionally, proprietary methods may be used. In one embodiment, the servo flaw characterization test 930 closely examines a servo sector that has caused an unsafe trigger or triggers to be generated. During this operation a number of disk revolutions may be required. During these disc revolutions the sector that has caused an unsafe trigger or triggers to be generated will again be tested to determine if it continues to generate servo unsafe signals. If the servo unsafe triggers occur repeatedly for X out of Y revolutions at the exact same servo sector, then that the servo sector is determined to be flawed and the location of the defective sector is noted. The defective servo sector can then be "mapped out," as described in greater detail above with respect to FIG. 6. In addition, the servo flaw characterization test 930 may stress the disc drive by applying incremental position offsets to the read/write head(s). For example, the servo flaw characterization test 930 may test servo sectors at track center, +/−⅛ track, +/−¼ track etc.

Following the servo characterization test 930, or following a determination by the servo unsafe determination operation 922 that no servo unsafe triggers have been set, the operation flow of the servo flaw test 900 continues to the all sectors tested determination operation 932. The all sectors tested determination operation 932 then determines all the sectors on the track currently being tested have been tested for servo flaws. If all of the sectors on the track have not been tested, the operation flow of the servo flaw test proceeds to an examine next servo operation 934, which examines the next servo sector to be tested in a similar manner as that described above with respect to examination operation 916. The operational flow of the servo flaw test 900 then continues to repeat the track testing "loop" defined by operations 918, 920, 922, 924, 926, 928, 930, 932, and 934 until all of the servo sectors on the track have been examined and tested for flaws.

Returning now to the all sectors tested operation 932. If the all sectors tested operation 932 determines that all of the sectors on the current track have been tested, an all tracks tested operation 936 next determines if all of the tracks that are to be tested have been tested. If the all of the tracks tested operation 936 determines that all of the tracks to be tested have not been tested, the operational flow of the servo flaw test 900 returns to the seek to next track operation 914, and the servo flaw test continues as shown in FIG. 9. If, however, the all of the tracks tested operation 936 determines that all of the tracks to be tested are have not tested, a set V_LIMIT operation 938 sets the value of V_LIMIT to a maximum and the servo flaw test 900 is ended 940. By setting the V_LIMIT value to a maximum, the set V_LIMIT operation effectively "turns off" those operations in the servo defect test 900 that detect defective servo sectors that are characterized by the read/write head velocity exceeding V_LIMIT.

Figure 10:
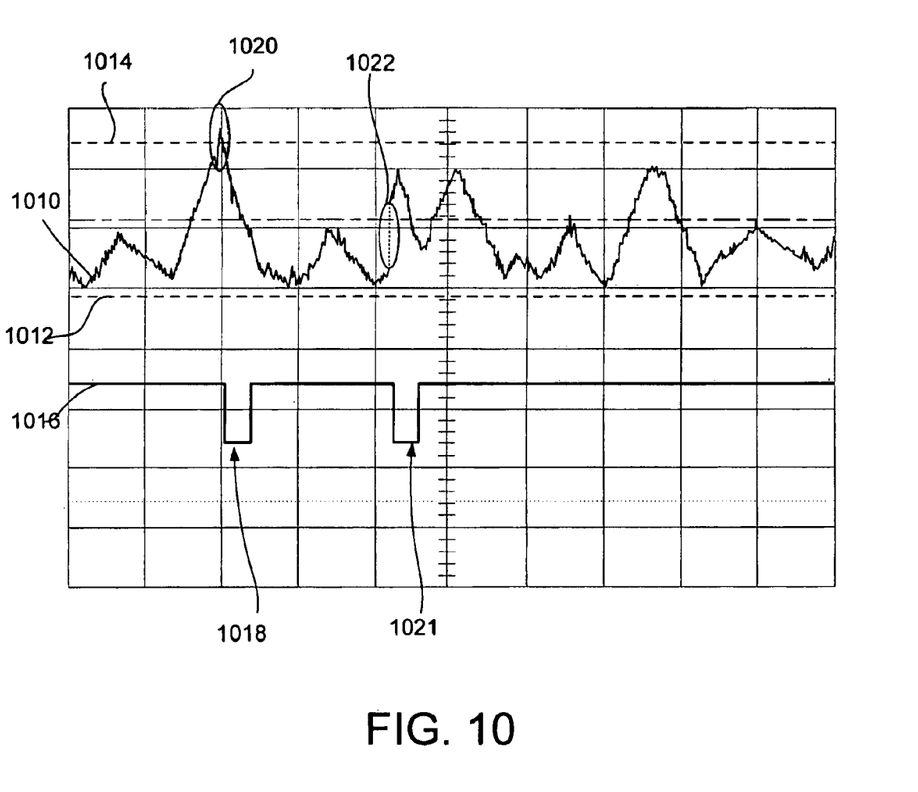
FIG. 10 illustrates an exemplary PES signal and servo unsafe signals generated using the servo flaw test characterized by the operational flow illustrated in FIG. 9.

FIG. 10 illustrates a PES signal 1010 over a given time in a disc drive that utilizes a servo flaw test, such as servo flaw tests 800 or 900, that triggers a servo unsafe condition when a PES value exceeds a PES threshold value and when a transducer exceeds a predetermined threshold value. Also illustrated in FIG. 10 are PES threshold limits 1012 and 1014. A servo unsafe signal 1016 is shown that has been triggered 1018 by the PES signal exceeding 1020 the threshold limit 1014. Shown in FIG. 10 is a servo unsafe signal that has been triggered 1021 by a track tear condition 1022, or other servo flaw that causes a rapid acceleration or position change of the head 118 across the track. As can be seen by comparing FIG. 10 with FIG. 7, servo flaw test, such as servo flaw tests 800 or 900, detect servo flaws that could not be detected by other methods. In this way, servo flaw tests 800 and 900 improve on the previously described servo flaw test 600 described with respect to FIG. 6, as well as other prior art servo flaw tests, in that the servo flaw tests 800 and 900 will catch a greater number and type of servo flaws. By more effectively locating and mapping out defective servo sectors, servo flaw tests 800 and 900 allows disc drive manufacturers to provide a more robust and reliable disc drive.

In summary, one embodiment of the present invention may be viewed as an apparatus and an associated method of detecting defective servo sectors in a data storage device (such as 100). In this embodiment, data is stored on tracks (such as 140). In addition to the data, each track may contains a plurality of servo sectors (such as 202). The data storage device further includes a transducer (such as 118) operable for accessing information in the servo sectors. In this method, a first servo sector on one of the tracks is accessed by the transducer (such as 812 or 916). A determination is then made as to whether a position error signal (PES) value associated with the first servo sector exceeds a predetermined PES threshold value (such as 820 or 918). If the PES value associated with the first servo sector exceeds the predetermined PES threshold value, the first servo sector is identified as defective (such as 816 or 930). If, however, the PES value associated with the first servo sector does not exceed the predetermined PES threshold value, a determination is made as to whether a transducer velocity signal associated with the first servo sector exceeds a predetermined velocity threshold value (such as 822 or 926). If the transducer velocity signal associated with the first servo sector exceeds the predetermined velocity threshold value, the first servo sector is identified as defective (such as 816 or 930).

In this embodiment, the determination of whether the PES value exceeds the predetermined PES threshold value may comprise determining if an absolute value of the PES value exceeds the predetermined PES threshold value (such as 820 or 918). Similarly, the determination of whether the transducer velocity signal exceeds the predetermined velocity threshold value may comprise determining if an absolute value of the transducer velocity signal exceeds the predetermined velocity threshold value (such as 824 or 926).

In this embodiment, identifying the first servo sector as defective may include generating a servo unsafe trigger (such as 920). In this embodiment identifying the first servo sector as defective may also include recording the address of the first servo sector in a defective servo sector map (such as 816) and/or performing a servo characterization test on the first servo sector (such as 930).

Another embodiment may also be viewed as an apparatus and associated method detecting defective servo sectors in a disc drive (such as 100). In this embodiment, a transducer velocity threshold value is initially set to a predetermined value (such as 912) and a position error signal (PES) threshold value is set to a predetermined value. An unexamined track is then selected from the plurality of tracks and seek is performed to the unexamined track (such as 914). The unexamined track is then examined, wherein examining comprises identifying each of the plurality of servo sectors on the unexamined track that either generates a PES value that exceeds the predetermined PES threshold value or has an associated velocity value that exceeds the velocity threshold value (such as 930). The selecting step and the examining step are repeated until each of the plurality of tracks has been examined (such as 936). Finally, the velocity threshold value is set to a maximum value after all of the plurality of tracks have been examined (such as 938).

In this embodiment, the step of identifying may include characterizing each servo sector on the unexamined track that either generates a PES value that exceeds a predetermined PES threshold value or that has an associated velocity value that exceeds the velocity threshold value (such as 930). Additionally, in this embodiment, the disc drive may generate a servo unsafe trigger upon the detection of a PES value that exceeds the predetermined PES threshold value and/or upon the detection of an associated velocity value that exceeds the velocity threshold value (such as 920).

Another embodiment may be viewed as a system for identifying defective servo sectors in a data storage device The system includes a data storage device (such as 100) having a plurality of tracks (such as 100), each track including a plurality of servo sectors (such as 202). The disc drive also includes a transducer (such as 118) operable for accessing information in the servo sectors. The system includes a means (such as 800 or 900) for identifying as defective servo sectors from the selected ones of the plurality of servo sectors that have an associated velocity value that exceeds a predetermined velocity threshold value and that also have an associated PES value that does not exceed a predetermined PES threshold value.

It will be clear that the present invention is well adapted to attain the ends and advantages mentioned as well as those inherent therein. While a presently preferred embodiment has been described for purposes of this disclosure, various changes and modifications may be made which are well within the scope and spirit of the present invention, as defined in the appended claims.

What is claimed is:

1. In a data storage device having data stored in tracks, each track including a plurality of servo sectors, the data storage device further including a transducer operable for accessing information in the servo sectors, a method of detecting defective servo sectors, comprising:

accessing a first servo sector on one of the tracks with the transducer;

determining if a position error signal (PES) value associated with the first servo sector exceeds a predetermined PES threshold value;

if the PES value associated with the first servo sector exceeds the predetermined PES threshold value, identifying the first servo sector as defective;

if the PES value associated with the first servo sector does not exceed the predetermined PES threshold value, determining if a transducer velocity signal associated with the first servo sector exceeds a predetermined velocity threshold value; and if the transducer velocity signal associated with the first servo sector exceeds the predetermined velocity threshold value, identifying the first servo sector as defective.

2. A method as described in claim 1, wherein determining if the PES value exceeds the predetermined PES threshold value comprises determining if an absolute value of the PES value exceeds the predetermined PES threshold value.

3. A method as described in claim 1, wherein determining if the transducer velocity signal exceeds the predetermined velocity threshold value comprises determining if an absolute value of the transducer velocity signal exceeds the predetermined velocity threshold value.

4. A method as described in claim 1, wherein the transducer velocity signal associated with the first servo sector is calculated by:

determining a PES value associated with a second servo sector preceding the first servo sector;

subtracting the PES value associated with the first servo sector from the PES value associated with the second servo sector to produce a difference value; and multiplying the difference value by a scaling constant.

5. A method as described in claim 1, wherein identifying the first servo sector as defective comprises generating a servo unsafe trigger.

6. A method as described in claim 5, wherein identifying the first servo sector as defective further comprises recording the address of the first servo sector in a defective servo sector map.

7. A method as described in claim 6, wherein the defective servo sector map is recorded on a reserve track on the data storage device.

8. A method as described in claim 1, wherein identifying the first servo sector as defective includes performing a servo characterization test on the first servo sector.

9. A method as described in claim 1, wherein the data storage device is a disc drive.

10. A computer readable medium having computer-executable instructions for performing the steps recited in claim 1.

11. In a disc drive having a plurality of tracks, each track including a plurality of servo sectors, the disc drive further including a transducer operable for accessing information in the servo sectors, a method of identifying defective servo sectors in the disc drive, comprising steps of:

setting a transducer velocity threshold value to a predetermined value;

setting a position error signal (PES) threshold value to a predetermined value;

selecting an unexamined track from the plurality of tracks and seeking to the unexamined track;

examining the unexamined track, wherein examining comprises the step of identifying each of the plurality of servo sectors on the unexamined track that either generates a PES value that exceeds the predetermined PES threshold value or has an associated velocity value that exceeds the velocity threshold value;

repeating the selecting step and the examining step until each of the plurality of tracks has been examined; and setting the velocity threshold value to a maximum value after all of the plurality of tracks have been examined.

12. A method as described in claim 11, wherein the step of identifying includes recording the location of the identified servo sectors in a defective servo sector map.

13. A method as described in claim 12, wherein the defective servo sector map is stored in non-volatile memory.

14. A method as described in claim 13, wherein the defective servo sector map is stored on a reserve track in the disc drive.

15. A method as described in claim 11, wherein the step of identifying includes determining an associated velocity value for only those servo sectors on the unexamined track that do not generate a PES value that exceeds the predetermined PES threshold value.

16. A method as described in claim 11, wherein the step of identifying includes characterizing each servo sector on the unexamined track that either generates a PES value that exceeds a predetermined PES threshold value or that has an associated velocity value that exceeds the velocity threshold value.

17. A method as described in claim 11, wherein the disc drive generates a servo unsafe trigger upon the detection of a PES value that exceeds the predetermined PES threshold value.

18. A method as described in claim 11, wherein the disc drive generates a servo unsafe trigger upon the detection of an associated velocity value that exceeds the velocity threshold value.

19. A computer readable medium having computer-executable instructions for performing the steps recited in claim 11.

20. A system for identifying defective servo sectors in a data storage device, comprising:

a data storage device having a plurality of tracks, each track including a plurality of servo sectors, the disc drive further including a transducer operable for accessing information in the servo sectors; and means for identifying as defective servo sectors from the selected ones of the plurality of servo sectors that have an associated velocity value that exceeds a predetermined velocity threshold value and that also have an associated PES value that does not exceed a predetermined PES threshold value.

21. A system as described in claim 20, wherein the data storage device comprises a disc drive.

22. A system as described in claim 21, wherein the selected ones of the plurality of servo sectors comprises each servo sector on the selective ones of the plurality of tracks.

23. A system as described in claim 21, wherein the location of each servo sector identified as defective is stored in non-volatile memory.

24. A system as described in claim 23, wherein the location of each servo sector identified as defective is stored on a reserve track of the disc drive.

25. A system as described in claim 21, wherein the means for identifying defective servo sectors includes a means for adjusting the predetermined velocity threshold value.

* * * * *